US010142696B2

(12) United States Patent
Eatedali et al.

(10) Patent No.: US 10,142,696 B2
(45) Date of Patent: Nov. 27, 2018

(54) SYSTEMS AND METHODS FOR PROVIDING A VIRTUAL SHARED MEDIA EXPERIENCE

(71) Applicant: Disney Enterprises, Inc., Burbank, CA (US)

(72) Inventors: Josiah Eatedali, Los Angeles, CA (US); Mark Arana, West Hills, CA (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

(21) Appl. No.: 14/967,217

(22) Filed: Dec. 11, 2015

(65) Prior Publication Data
US 2017/0171626 A1 Jun. 15, 2017

(51) Int. Cl.
H04N 21/4788 (2011.01)
H04N 21/442 (2011.01)
H04N 21/482 (2011.01)
H04N 21/231 (2011.01)
H04N 21/254 (2011.01)
H04N 21/4627 (2011.01)
H04N 21/84 (2011.01)

(52) U.S. Cl.
CPC ... H04N 21/4788 (2013.01); H04N 21/23109 (2013.01); H04N 21/2541 (2013.01); H04N 21/44204 (2013.01); H04N 21/4627 (2013.01); H04N 21/4825 (2013.01); H04N 21/84 (2013.01)

(58) Field of Classification Search
CPC ......... H04N 21/4788; H04N 21/23109; H04N 21/2541; H04N 21/44204; H04N 21/4627; H04N 21/4825; H04N 21/84
See application file for complete search history.

(56) References Cited

U.S. PATENT DOCUMENTS

| | | | | |
|---|---|---|---|---|
| 2009/0249223 A1* | 10/2009 | Barsook | ................... | H04N 7/15 715/753 |
| 2013/0246157 A1* | 9/2013 | Puppin | ................... | G06Q 30/02 705/14.36 |
| 2014/0101244 A1* | 4/2014 | Klein | ..................... | G06Q 10/00 709/204 |
| 2015/0245098 A1* | 8/2015 | Liew | ................ | H04N 21/25891 725/40 |
| 2016/0014461 A1* | 1/2016 | Leech | ................ | H04N 21/4668 725/14 |

* cited by examiner

Primary Examiner — Ricky Chin
Assistant Examiner — Susan X Li
(74) Attorney, Agent, or Firm — Farjami & Farjami LLP

(57) ABSTRACT

There is provided a system having a memory and a processor to establish a viewing group having a plurality of users, provide an ordered list of a plurality of media contents, make a first media content in the ordered list of the plurality of media contents available for viewing by each of the plurality of users in the viewing group, track a viewing progress of the first media content by each of the plurality of users in the viewing group, and make a second media content in the ordered list of the plurality of media contents available for viewing by each of the plurality of users in the viewing group based on one or more rules related to the viewing progress of the first media content by each of the plurality of users in the viewing group.

20 Claims, 3 Drawing Sheets

- User has access to the episode

- User has completed the episode

- User cannot access the episode

SYSTEMS AND METHODS FOR PROVIDING A VIRTUAL SHARED MEDIA EXPERIENCE

BACKGROUND

Conventionally, terrestrial television networks and cable television networks broadcast television shows as part of each network's nightly or weekly programming. Historically, watching a television show required a user to view the television show at the broadcast time, or view a re-run of the show at a later time. Even then, some were still not able to watch re-runs due to their jobs or other commitments that conflicted with the broadcast time. Thereafter, devices such as VCRs and digital recorders allowed viewers to time-shift their viewing experience by making a personal recording of a television show and watching it at a convenient time.

Watching television shows and discussing the shows have provided many people with social connections, and provided ways to bond with others. Following and discussing a film franchise, character arcs, plot events or a favorite actor's career are common conversation topics. Serial novels and books by prolific authors have also provided similar conversation starters, such as discussing what happened to certain characters in a more recent novel from a certain author.

SUMMARY

The present disclosure is directed to systems and methods for providing a virtual shared media experience, substantially as shown in and/or described in connection with at least one of the figures, as set forth more completely in the claims.

DETAILED DESCRIPTION

Figure 1:
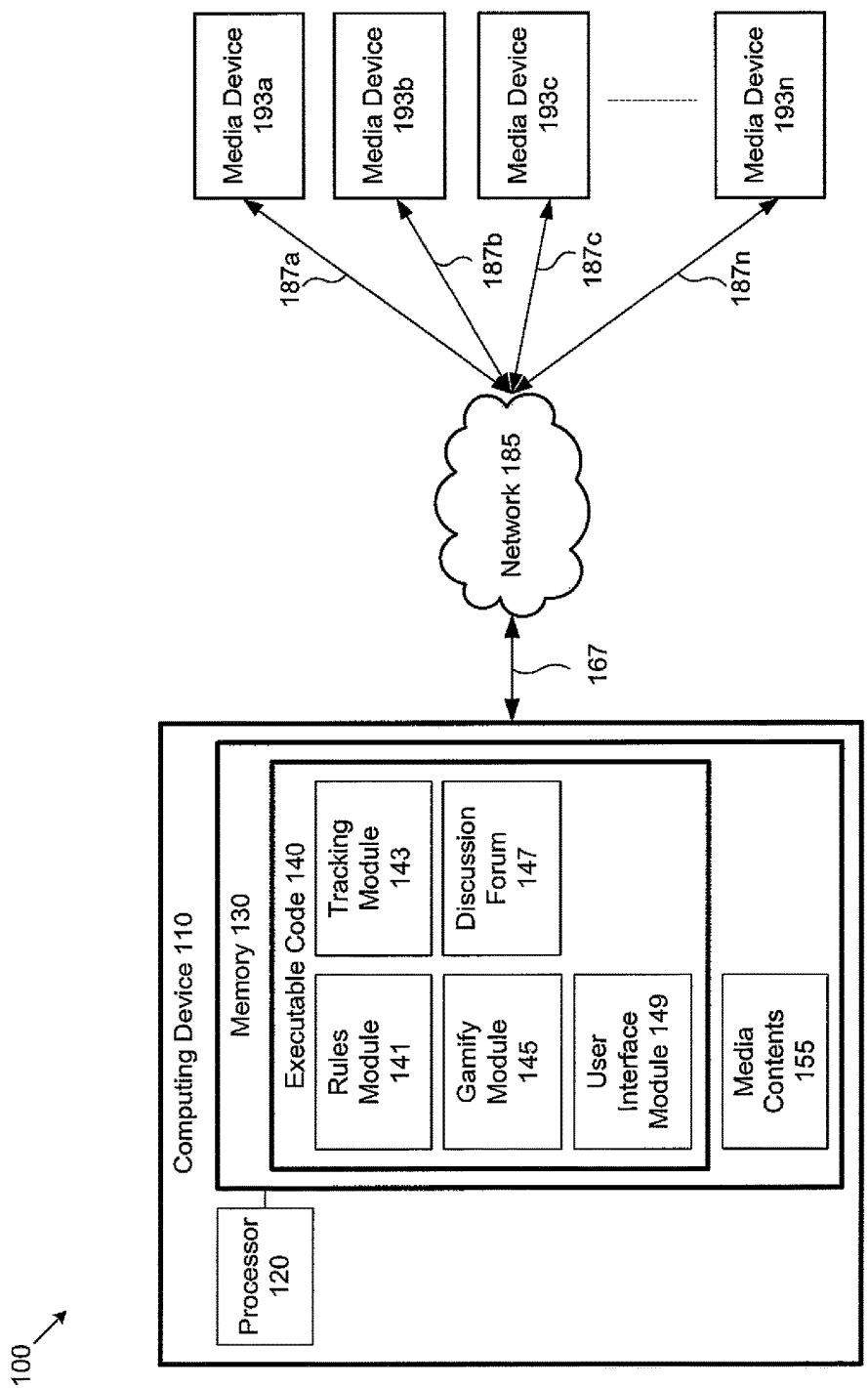
FIG. 1 shows a diagram of an exemplary system for providing a virtual shared media experience, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for providing a virtual shared media experience, according to one implementation of the present disclosure. System 100 includes computing device 110, network 185, and media devices 193a-193n. Computing device 110 includes processor 120 and memory 130. Processor 120 is a hardware processor, such as a central processing unit (CPU) used in computing devices. Memory 130 is a non-transitory storage device for storing computer code for execution by processor 120, and also storing various data and parameters. Memory 130 includes executable code 140 and media contents 155. Computing device 110 may be a media server that provides media content 115 as part of a subscription or ad-supported video streaming service, e.g., Netflix, Amazon Prime, Hulu, etc., a content aggregation service, e.g., Disney Movies Anywhere, etc., or a transactional service, e.g., iTunes, Amazon Instant Video, etc., which monitors and tracks entertainment consumption. Alternatively, computing device 110 may be a third-party computing server that is in communication with the aforementioned media server through network 185.

Executable code 140 includes one or more software modules stored in memory 130 for execution by processor 120 of commuting device 110 to provide a virtual shared media experience that may be shared by users of media devices 193a-193n. Executable code 140 may establish viewing groups in response to receiving user inputs from media devices 193a-193n, and each viewing group may include a plurality of users. Each viewing group may have an associated media content or a plurality of associated media contents, such as media contents 155, and executable code 140 may create an ordered list of the associated media contents. As shown in FIG. 1, executable code 140 may include rules module 141, tracking module 143, gamify module 145, discussion forum 147, and user interface module 149.

Rules module 141 is a software module within executable code 140 for execution by processor 120 to regulate the virtual shared media experience of the users in the viewing group. Rules module 141 may include a plurality of rules governing the virtual shared media experience, such as a maximum episode gap between users in the viewing group, where an episode gap may refer to a number of episodes of a television show between a user who has watched the fewest number of episodes from the ordered list of media contents and a user who has viewed the greatest number of episodes from the ordered list of media contents. For example, when a viewing group is viewing a television show including five episodes and the viewing group has a two-episode gap rule, no user in the viewing group will be allowed to view episode three until all users have viewed episode one, and no user will be permitted to view episode four until all users have viewed episode one and episode two.

Rules module 141 may include a rule establishing a maximum amount of time each user of the viewing group has to view a next episode to remain in the viewing group, e.g., to remain in the viewing group, each user must watch the next available episode within the defined time, such as one day, one week, etc., and a user failing to watch the next available episode within the defined time will be removed from the viewing group. Rules module 141 may include a limitation on when episode may be viewed, e.g., episodes can only be watched on weekends/weeknights, etc.

Rules module 141 may grant a user access to bonus material, such as making of one or more episodes or commentary on one or more episodes, once a user has watched an episode in the ordered list of media contents. Rules module 141 may additionally control the order in which a user views media contents of the ordered list by limiting access to subsequent episode(s), prohibiting a user from jumping ahead to a subsequent media contents or episodes. In some implementations, rules module 141 may include a predetermined set of rules, which may be defined by a content administrator and/or each user of the viewing group.

Tracking module 143 is a software module within executable code 140 for execution by processor 120 to track each user's progress in the ordered list of media contents. In some implementations, tracking module 143 may automatically track a user's viewing of media contents 155, or tracking module 143 may require a user to manually update the user's progress as the user views media contents 155. For example, when media contents 155 include a season of a television show available online or chapters of a digital book, tracking module 143 may automatically update the progress of a user when the user watches an episode of the television show or reads a chapter of the digital book. In various implementations, media contents 155 may be one of music, video games, virtual reality experiences, comic books and a variety of video contents, such as concert videos, music videos, Internet videos, and the like.

Gamify module 145 may be a software module within executable code 140 for execution by processor 120 to provide incentives, challenges, or other ways of gamifying the virtual shared media experience. For example, gamify module 145 may award points to users according to the order in which they view episodes of media contents 155, such as awarding one hundred (100) points to the first user who finishes an episode, eighty (80) points to the second user who finishes the episode, etc. In some implementations, points may be awarded based on completion of viewing a media content and/or successfully completing a questionnaire or a quiz related to the media content. For example, gamify module 145 may challenge the users in a viewing group to achieve a highest score on a trivia quiz related to an episode of a television show watched by the viewing group, or to achieve a highest total score on a series of quizzes, each quiz relating to a subsequent episode of the television show watched by the viewing group.

Gamify module 145 may award badges to users for achieving goals, where a badge may be an icon that is displayed in to other users, such as a badge for watching a certain number of episodes in one day or one week, a badge for watching an episode each day for a certain number of consecutive days, a badge for reaching benchmarks in total numbers of episodes watched, etc.

Discussion forum 147 is a software module within executable code 140 for execution by processor 120 to allow a user in a viewing group to access and participate in discussions about the virtual shared media experience with other users in the viewing group. In some implementations, access to discussion forum 147 may be limited based on the progress of the user in viewing media contents in the ordered list of media contents. For example, a discussion related to a television show may be segmented into discussions corresponding to each episode of the television show, and a user may be granted access to the discussions based on the user's progress in media contents 155, such as a discussion forum related to a television show having five (5) episodes, of which a user has viewed episode one and episode two, the user may be allowed to participate in discussions related to episodes one and two, but may be prevented from viewing and/or participating in discussions related to episodes three through five. Discussion forum 147 may additionally allow users to post and view video responses and/or reactions recorded by users in the viewing group.

User interface module 149 is a software module within executable code 140 for execution by processor 120 to provide a user with an interface to interact with computing device 110. In some implementations, user interface module 149 may provide a user with an option to view existing viewing groups, request to join an existing viewing group, create a new viewing group, add users to a new viewing group, add users to an existing viewing group, etc. Users may be added to a new or existing viewing group by selecting users from a social media friend list, selecting users from a list of suggested users who have similar interests which may be provided, for example, by executable code 140.

User interface module 149 may allow a user to add other users to a new or existing viewing group by entering identifying information about the user to be added, such as an email address, a social media account name, a social media user name, a social media nickname, a phone number, etc. User interface module 149 may also allow users to select rules governing a virtual shared media experience from a list of predefined rules, or to define a new rule to govern the virtual shared media experience. For example, user interface module 149 may present a predefined set of rules to a user for use with a viewing group, allow a user to modify or customize a rule or a plurality of rules for use with a viewing group, allow a user to create a user-defined rule for use with a viewing group, etc. Media contents 155 may include video, audio and/or text media content, such as a television series that has a set broadcast time, an on-demand video series that has no set broadcast time, an audio content, such as an audio book or a series of audio books, a book, a series of books, or other media contents.

In some implementations, media contents 155 may include a plurality of media contents, such as episodes of a show, chapters of a book, series of books or movies, television series or movies in particular genres, etc., from which the ordered list of media contents may be created either by the users or the content administrator of computing device 110. Media contents 155 may include a plurality of media contents, some of which include overlapping plotlines, and the ordered list of media contents may include crossover episodes that are relevant to a common storyline. For example, media contents 155 may include episodes from two (2) different but related television shows in which a character from the first television show appears in a number of episodes of the second television show. In such a case, the ordered list of media contents may include episodes of the first television show including the character, and episodes of the second television show that include the character from the first television show, i.e., the ordered list of media contents follows the timeline of the character from the first television show, even when the character appears in the second television show.

In some implementations, a user may not own or have access to media content 155. In such a situation, executable code 140 may present an incentive to purchase the media content or access to the media content, such as through a subscription video streaming service. For example, if a user is a member of a viewing group, or wants to join a viewing group, but does not own the media content to be viewed in the virtual shared media experience associated with that viewing group, user executable code 140 may present the user with a message including a link to purchase the media content and/or a join a subscription video streaming service that provides the media content.

Network 185 is a computer network connecting computing device 110 to media devices 193a-193n via connection 167 and respective connections 187a-187n. In some implementations, network 185 may be the Internet. Each media devices 193a-193n may be a TV, a computer, a tablet computer, a digital reader, a smart phone, a digital video recorder, a set top box, a blu-ray player, an AppleTV, a Google Chrome, etc.

Figure 2:
FIG. 2 shows a diagram of an exemplary matrix of user access to a media content, according to one implementation of the present disclosure.
Figure 2:
Figure 2:

FIG. 2 shows a diagram of an exemplary matrix of user access to media contents 155, according to one implementation of the present disclosure. Matrix 200 shows a scenario including n users viewing an ordered list of media contents including m episodes, where both n and m are integer numbers, and the scenario is governed by a rule that does not allow more than one episode gap between viewing users. As shown in FIG. 2, executable code 140 allows access by all users to episode 1, which all users have viewed, and allows access by all users to episode 2, which has been viewed by all users except user 2. As such, executable code 140 does not allow user 2 to access episode 3, even though Episode 3 is available to other users, because User 2 has not yet watched episode 2. Episode 4, however, is not available to any of the users, because allowing access to episode 4 would violate the one episode gap rule, based on the one episode gap existing between user 1, who has viewed episodes 1-3, and user 2, who has only viewed Episode 1. In the scenario depicted in FIG. 2, if user 2 views episode 2, executable code 140 updates the status of episode 4 to allow access to any user who has watched Episodes 1-3.

Figure 3:
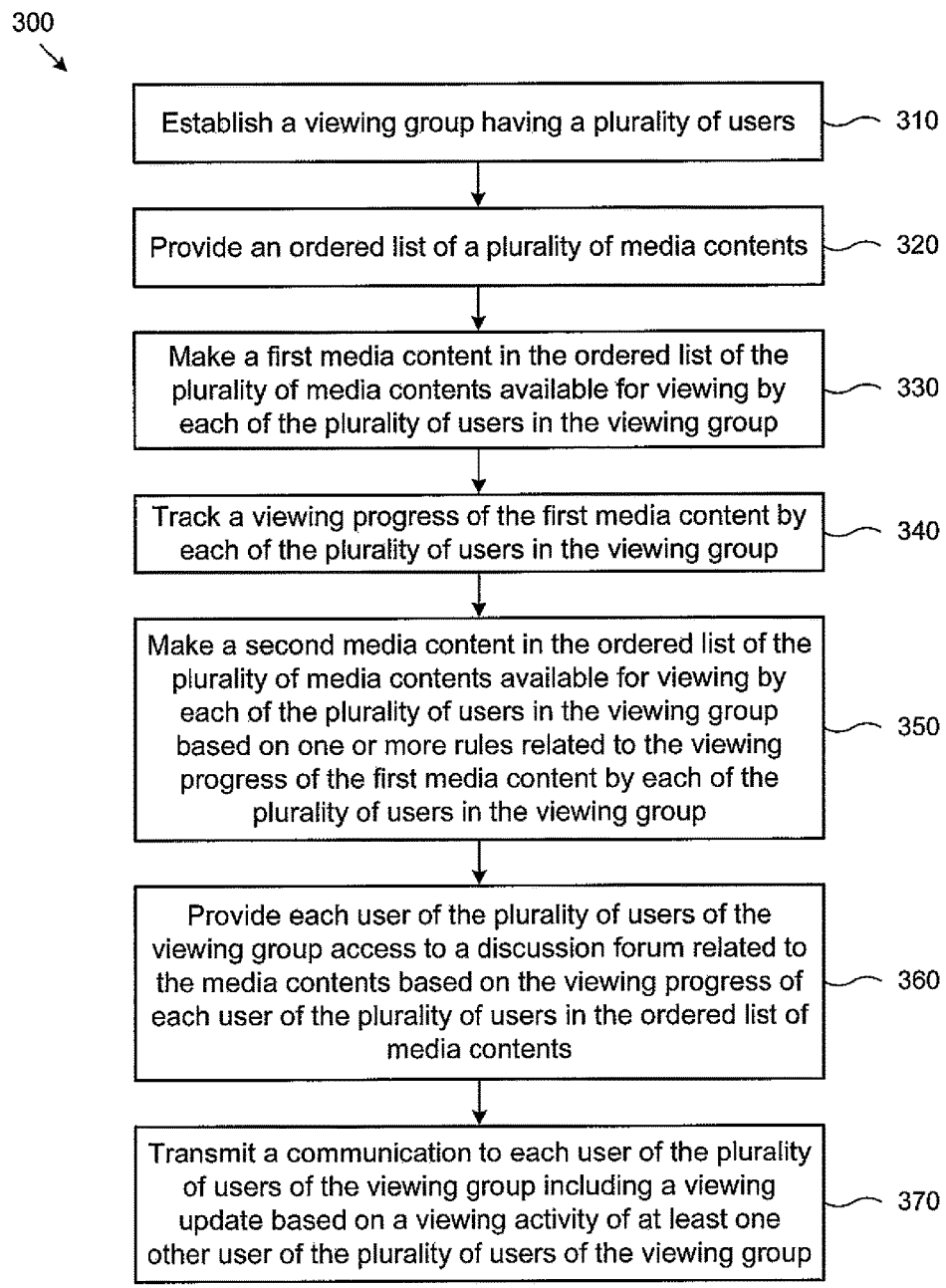
FIG. 3 shows a flowchart illustrating an exemplary method of providing a virtual shared media experience, according to one implementation of the present disclosure.

FIG. 3 shows a flowchart illustrating an exemplary method of providing a virtual shared media experience, according to one implementation of the present disclosure. Flowchart 300 begins at 310, where executable code 140 establishes a viewing group having a plurality of users. Computing device 110 may receive a user input from media device 193 via network 185 to add a user to a viewing group. In some implementations, formation of a viewing group may include an interaction between a social media website and/or application and a media service. For example, executable code 140 may receive an input from the social media website and/or application to add a user to a viewing group associated with media contents 155, and executable code 140 may link the viewing group with a media service that provides the associated media content, such as an online streaming service. Each viewing group may have a plurality of users, and associated media contents, such as media contents 155. The viewing group may be a group of users viewing a television series, a movie series, or a genre of movies, or may be members of a book club, a study group, or other groups accessing the same media contents. In some implementations, viewing groups may be formed by a primary user. The primary user may select a media content to share in a viewing group. The primary user may select additional users to add to the viewing group, for example, from a friend list in a website or an application, such as a social media website or application, or a video streaming service.

At 320, executable code 140 provides an ordered list of the plurality of media contents in media contents 155. Executable code 140 may determine the order of media contents 155 in the ordered list of media contents, and/or a user of the viewing group associated with the ordered list of media contents may assign the order of media contents 155 in the ordered list of media contents. In some implementations, executable code 140 may set the order of media contents 155 in the ordered list of media contents, and the ordered list of media contents may be modifiable by the users in the viewing group. The ordered list of the plurality of media contents may determine an order in which each user of the viewing group must view the media contents. In some implementations, the ordered list presents a series of media contents in order from a first media content to a last media content, such as a first episode of a television series to a last episode of the television series, a first chapter of a book to a last chapter of the book, or a first book in a book series to a last book in the book series. In other implementations, the ordered list of media contents may include episodes, chapters, or books from a plurality of shows or books, with the episodes, chapters, or books including a common theme or plotline.

At 330, executable code 140 makes a first media content in the ordered list of the plurality of media contents available for viewing by each of the plurality of users in the viewing group. In some implementations, executable code may make the first media content available to stream or download, so that each user in the viewing group may access the first media content. Once media contents 155 is made available to the plurality of users in the viewing group, each user of the viewing group may view media contents 155. The way in which a user views media contents 155 may depend on the type of content included in media contents 155, e.g., the user may read a printed media content or watch a video media content, etc.

At 340, executable code 140 tracks a viewing progress of the first media content by each of the plurality of users in the viewing group. In some implementations, tracking module 143 may automatically track the progress of each user of the viewing group as the user progresses through the ordered list of media contents. Tracking module 143 may consider a user to have finished media contents 155 when the user has viewed a certain or substantial portion of media contents 155, such as 80%, 90%, 95%, etc. In other implementations tracking module 143 may track user progress through the ordered list of media contents based on a user input. For example, when media contents 155 include a print media, tracking module 143 may rely on the user reporting and manually updating the ordered list. Executable code 140 may track users of the viewing group who view media contents 155 in a variety ways. For example, a first user of the viewing group may view a movie in media contents 155 using an Internet connected blu-ray player using a first online streaming service, such as Netflix, and a second user of the viewing group may view the same movie using a second online streaming service, such as Amazon. In some implementations, executable code 140 may include a visual representation of each user's viewing progress, such that any user may be able to check the progress of each of the other users. In some implementations, the visual representation may be a bar chart in which each user is assigned a progress bar.

At 350, executable code 140 makes a second media content in media contents 155 available for viewing by each of the plurality of users in the viewing group based on one or more rules related to the viewing progress of the first media content by each of the plurality of users in the viewing group. In some implementations, rules module 141 may require each user of the viewing group to view the first media content before making the second media content available, or rules module 143 may make the second content available to users as each user finishes the first media content, but prevent the users from continuing to a subsequent media content of the ordered list of media contents. Rules module 141 may include rules such as a gap limit to limit the number of episodes between the users in the viewing group, a specific break point where all users must hit before any user can continue, e.g. everyone must get to midseason before any user can continue, time allowed to lapse without watching before a user is removed from the viewing group, whether video reactions post episode are allowed, etc. These rules may be selected by the main user and presented as a set offer to participate under those rules to additional users, or may be rules that are agreed upon by all users when the viewing group is creates.

In some implementations, rules module 141 may provide access to the second media content if a user has not viewed the first media content and a waiting period has passed. This may prevent a user who has stopped participating from preventing the remainder of the viewing group from proceeding with the virtual shared media experience. In other implementations, a user who wishes to proceed beyond the media contents available in the virtual shared media experience may be presented with an option to opt out of complying with a rule or opt out of the viewing group before a subsequent media content can be made available. If the user chooses to opt out, a notification may be sent to other users in the viewing group notifying them of the decision by a particular user to opt out. In some implementations, users in the viewing group may agree modify a rule or add a rule, such as a rule requiring the plurality of users in the viewing group to vote on which media content of media contents 155 to view next, such as when the ordered list of media contents includes genre of movies. Rule module 141 may also include rules such as whether a user may add another user to the viewing group after the viewing has begun, how far into the virtual shared media experience an existing user may add a new user to the viewing group, whether consent of some or all of the other users of the viewing group is required to add a new user to the viewing group.

Once users are added to the viewing group and rules are agreed upon, the users in the viewing group may view the media contents per the agreed upon rule(s) until an action attempted by the user would violate a rule, in which case the media content interface may be changed within the media content service to enforce the rules. For example, the user interface may not allow the user to activate a control to begin viewing the next episode in the ordered list of media contents if the user has advanced to the episode gap limit determined in the rules. The user interface may present a user who attempts to play the next episode with a message reminding the user that they are part of the viewing group and must wait for the other users. Once the other users in the viewing group have viewed the necessary episodes, the user who was previously blocked by the rule may receive a notification, either in app or via email, that other users in the viewing group have caught up and the user can continue watching.

At 360, executable code 140 provides each user of the plurality of users of the viewing group access to a discussion forum related to media contents 155, such as discussion forum 147, based on the viewing progress of each user of the plurality of users in media contents 155. When a user views a media content of media contents 155, the user may want to engage in discussions about the media content. In some implementations, executable code 140 may provide a user access to discussions related to the ordered list of media contents associated with the viewing group of which the user is a member. In some implementations, executable code 140 may provide a user limited access to discussions forum 147, for example, limiting access to discussions related to the media contents the user has viewed, but not to discussions related to media contents the user has not viewed.

In some implementations, the viewing group may include a study group, and the ordered list of media contents may include topics or subjects assigned to the group. Executable code 140 may provide access to discussion forum 147, and the access may be limited by the topics and/or subjects which the user has completed, ensuring that the user may contribute meaningfully to the study group. In other implementations, the viewing group may include a book club, and discussion forum 147 may include discussions about different chapters of a book and/or books of the book club's ordered list of media contents. Executable code 140 provide access to a discussion in discussion forum 147 after a user has viewed a chapter in a book the book club is reading, or after the user has finished a book the book club is reading.

At 370, executable code 140 transmits a communication to each user of the plurality of users of the viewing group, including a viewing update based on a viewing activity of at least one other user of the plurality of users of the viewing group. For example, executable code 140 may provide an option for email-based notifications when other users have watched an episode, so as to allow a user to continue viewing media contents 155 when new media contents become available. In some implementations, executable code 140 may transmit a communication to a user when the user has attempted an action that would violate a rule of a viewing group of which the user is a member, such as a warning that proceeding with viewing the next episode would violate a term of the viewing group agreement, and the user must opt-out of a rule or opt-out of the viewing group. The communication may be a pop-up message, an email, an SMS message, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
a non-transitory memory storing an executable code; and
a hardware processor executing the executable code to:
establish a viewing group having a plurality of users;
provide an ordered list of a plurality of media contents;
make a first media content in the ordered list of the plurality of media contents available for viewing by each of the plurality of users in the viewing group;
make a second media content in the ordered list of the plurality of media contents unavailable for viewing by each of the plurality of users in the viewing group;
stream the first media content for a first viewing by each of the plurality of users in the viewing group upon a request by each respective one of the plurality of users after making the first media content available;
track a progress of the first viewing of the streamed first media content by each of the plurality of users in the viewing group;
make the second media content in the ordered list of the plurality of media contents available for viewing by each of the plurality of users in the viewing group, based on the tracking and in response to complying with one or more rules related to the progress of the first viewing of the streamed first media content by each of the plurality of users in the viewing group; and
stream the second media content for a second viewing by each of the plurality of users in the viewing group upon another request by each respective one of the plurality of users after making the second media content available based on the tracking the progress of the first viewing;

wherein the one or more rules include a maximum allowed gap between the first media content and the second media content, and wherein the one or more rules are selected by a first user of the plurality of users and agreed upon by the plurality of users.

2. The system of claim 1, wherein the hardware processor further executes the executable code to:

provide each user of the plurality of users of the viewing group access to a discussion forum related to the media contents based on the progress of the first viewing of each user of the plurality of users in the ordered list of media contents.

3. The system of claim 1, wherein the hardware processor further executes the executable code to:

transmit a communication to each user of the plurality of users of the viewing group including a viewing update based on a viewing activity of at least one other user of the plurality of users of the viewing group.

4. The system of claim 1, wherein the ordered list of media contents is a genre of movies.

5. The system of claim 4, wherein a user of the plurality of users of the viewing group determines an order for the ordered plurality of media contents.

6. The system of claim 1, wherein the ordered list of media contents is one of a book series, a television series, a web series, and a movie series.

7. The system of claim 1, wherein the one or more rules includes a user defined rule.

8. The system of claim 1, wherein tracking the viewing progress includes a user of the plurality of users of the viewing group updating a corresponding user account after the first viewing of the first media content of the ordered list of media contents.

9. The system of claim 1, wherein each of the plurality of media contents is an episode of a media series.

10. The system of claim 1, wherein a user of the plurality of users in the viewing group may exit the viewing group to gain access to the second media content before the second media content is made available to the viewing group.

11. A method for use with a system including a hardware processor and a non-transitory memory, the method comprising:

establishing, using the hardware processor, a viewing group having a plurality of users;

providing, using the hardware processor, an ordered list of a plurality of media contents;

making, using the hardware processor, a first media content in the ordered list of the plurality of media contents available for viewing by each of the plurality of users in the viewing group;

making, using the hardware processor, a second media content in the ordered list of the plurality of media contents unavailable for viewing by each of the plurality of users in the viewing group;

streaming, using the hardware processor, the first media content for a first viewing by each of the plurality of users in the viewing group upon a request by each respective one of the plurality of users after making the first media content available;

tracking, using the hardware processor, a progress of the first viewing of the streamed first media content by each of the plurality of users in the viewing group;

making, using the hardware processor, the second media content in the ordered list of the plurality of media contents available for viewing by each of the plurality of users in the viewing group, based on the tracking and in response to complying with one or more rules related to the progress of the first viewing of the streamed first media content by each of the plurality of users in the viewing group; and streaming, using the hardware processor, the second media content for a second viewing by each of the plurality of users in the viewing group upon another request by each respective one of the plurality of users after making the second media content available based on the tracking the progress of the first viewing;

wherein the one or more rules include a maximum allowed gap between the first media content and the second media content, and wherein the one or more rules are selected by a first user of the plurality of users and agreed upon by the plurality of users.

12. The method of claim 11, further comprising:

providing, using the hardware processor, each user of the plurality of users of the viewing group access to a discussion forum related to the media contents based on the progress of the first viewing of each user of the plurality of users in the ordered list of media contents.

13. The method of claim 11, wherein the processor further executes the executable code to:

transmitting, using the hardware processor, a communication to each user of the plurality of users of the viewing group including a viewing update based on a viewing activity of at least one other user of the plurality of users of the viewing group.

14. The method of claim 11, wherein the ordered list of media contents is a genre of movies.

15. The method of claim 14, wherein a user of the plurality of users of the viewing group determines an order for the ordered plurality of media contents.

16. The method of claim 11, wherein the ordered list of media contents is one of a book series, a television series, a web series, and a movie series.

17. The method of claim 11, wherein the one or more rules includes a user defined rule.

18. The method of claim 11, wherein tracking the viewing progress includes a user of the plurality of users of the viewing group updating a corresponding user account after the first viewing of the first media content of the ordered list of media contents.

19. The method of claim 11, wherein each of the plurality of media contents is an episode of a media series.

20. The method of claim 11, wherein a user of the plurality of users in the viewing group may exit the viewing group to gain access to the second media content before the second media content is made available to the viewing group.

* * * * *